June 11, 1968 A. R. RABINOWITZ 3,387,469

NUT LOCK

Filed Oct. 19, 1965

INVENTOR.
Alan R. Rabinowitz
BY
Philip S. Hilbert
ATTORNEY 3,387,469
NUT LOCK
Alan R. Rabinowitz, 72—81 113th St.,
Forest Hills, N.Y. 11375
Filed Oct. 19, 1965, Ser. No. 497,715
12 Claims. (Cl. 70—232)

ABSTRACT OF THE DISCLOSURE

A nut lock having means for enclosing a nut on a stud together with key operated latch means for rendering the enclosing means ineffective and for allowing the nut to be turned on the stud.

---

It is frequently desirable to prevent the unauthorized removal of a member which is bolted in place by the mere removal of the nuts from the studs or bolts which hold such member in place. A typical instance is the case of the wheels of motor vehicles which have a hub portion mounted on a circular array of studs or bolts extending from the wheel support means of the vehicle, with nuts on the respective studs to lock the wheel in place. The usual hub cap, readily removable, conceals the nuts; yet permits easy removal of the nuts from their respective studs, to allow for theft of the wheel and the tire thereon.

Accordingly, an object of this invention is to provide improved nut lock means which lends itself to easy mounting over a nut while the same is on its stud, to prevent unauthorized access to such nut; yet permitting removal of such lock means by suitable key means to expose the nut for authorized removal thereof from its stud.

A further object of this invention is to provide improved nut lock means for enclosing a nut, which can be quickly mounted and demounted from the nut by means of accessory key means; such lock means being of simple construction and economical to manufacture.

Other objects of this invention will in part be obvious and in part hereinafter pointed out.

In the drawing, FIG. 1 is a side elevational view, with parts in section, showing a nut lock embodying the invention;

Figures 1, 2, 3, 4:
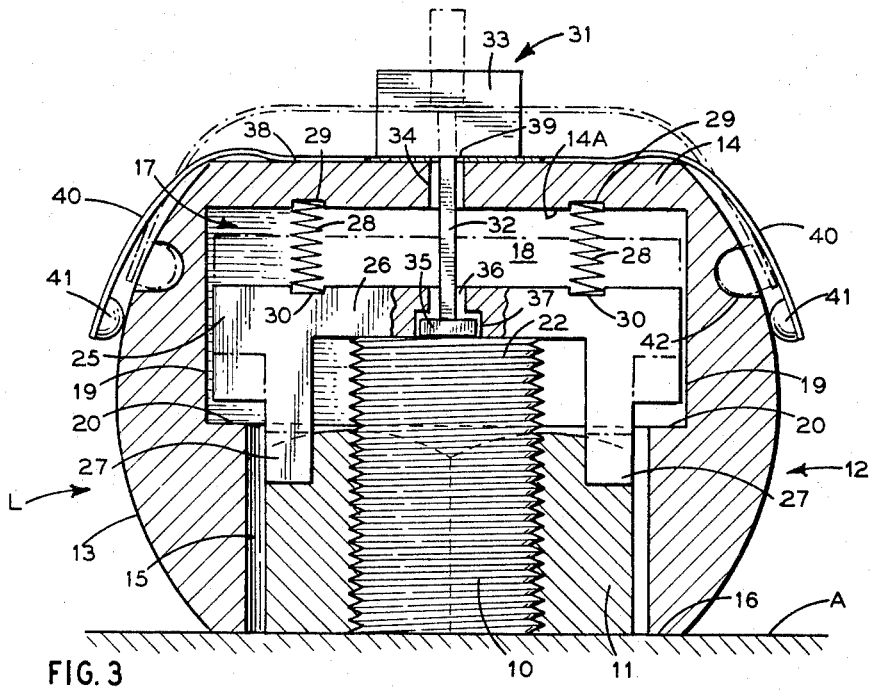
FIG. 2 is a bottom plan view thereof.
FIG. 3 is a top plan view of a nut which is to be locked against removal by the device of the invention.
FIG. 4 is a partial plan view of an element of the key means, with part in section.

The nut lock of the instant invention is designed to fully enclose a nut threaded on a stud or bolt for securing a member, such as a vehicle wheel, in place. The thus enclosed nut cannot be removed from its stud or bolt until the nut lock is removed and this can only be done by means of suitable key means provided for the purpose.

Thus, as shown in the drawing, a threaded stud or bolt 10 extends from a member, not shown, which could be a vehicle wheel support, or the like. A nut 11 threaded on stud 10 clamps a member A, which may take the form of the mounting flange of a vehicle wheel, in place, in a conventional manner. It is understood, that in the case of such a vehicle wheel, a plurality of studs 10 in a circular array extend from the wheel support and nuts 11 thereon, serve to properly clamp the wheel in place. However, a single nut lock embodying the invention, generally indicated at L, applied to a single stud 10 and its nut 11, is sufficient to protect the wheel from unauthorized removal from the vehicle.

Nut lock L comprises a recessed member 12 having a part spherical outer surface portion 13 and a flat top wall portion 14. Member 12 is formed with a circular recess 15 extending inwardly from a bottom surface portion 16 which is parallel to top wall portion 14. Member 12 is further formed with a rectangular recess portion 17 which extends inwardly from recess 15 and is defined by top wall 14, side walls 18 and end walls 19, forming oppositely disposed shoulders 20 at the juncture of recesses 15, 17.

The member 12 is adapted to be placed over the projecting portion of stud 10 and nut 11 thereon which are received in recesses 15, 17; the bottom surface 16 abutting member A, to thereby fully enclose nut 11. The side walls 18 of recess 17 on a central portion thereof, are threaded as at 21 so as to receive the outer end portion of stud 10 therein in threaded engagement therewith, thereby disposing nut 11 in recess 15.

As shown in FIG. 3, nut 11 is formed on its top surface with a pair of diametrically opposed slots 24 opening at their outer ends. Latch means, generally indicated at 25, is provided for disengageable connection to said nut 11 by way of slots 24 thereof. Latch means 25 takes the form of a bifurcated member having an elongated yoke portion 26 with depending, inset arm portions 27 at the opposite ends thereof. The yoke portion 26 of latch means 25 is receivable in recess 17 of member 12 and is non-rotatably disposed therein.

When nut lock L is in place over nut 11 and in engaged relation to stud 10, the lower ends of arms 27 are received in slots 24 of nut 11; the latch means 25 being retained in engaged relation to nut 11 by a pair of coil springs 28 located between the inner surface 14A of wall portion 14 of member 12 and top surface portions of yoke portion 26 of latch means 25. To this end, shallow recesses 29 in surface portion 14A of wall portion 14 and similar, opposed recesses 30 in the top surface portions of yoke portion 26, are adapted to receive the opposite ends of springs 28 therein.

It will be apparent that with nut 11 tightly screwed on stud 10 in clamping relation to member A, and with latch means 25 in engaged relation to nut 11; the member 12 cannot be hand turned to disengage the same from the outer end portion 22 of stud 10. Furthermore, considering the substantial torque normally necessary to unscrew nut 11 from stud 10, the surface configuration of member 12 does not lend itself to adequate engagement by turning tools such as wrenches or the like to provide the required turning torque.

Means is provided for removing member 12 from stud 11, and to this end there is provided special key means for the purpose indicated generally at 31. Key means 31 comprises a stem portion 32 having a handle 33 affixed to the upper end thereof. The stem portion 32 has a square cross section and is adapted to pass through an opening 34 in wall portion 14, being located centrally thereof. Opening 34 is of a size to permit rotation of stem portion 32 therein. The lower end of stem portion 32 has a short cross member 35 affixed thereto to provide a T shaped end to that portion of key means 31.

The yoke portion 26 of latch means 25 is formed on a central portion thereof with a pair of communicating slots 36, 37 disposed at right angles to each other and adapted to receive therein the T shaped lower end portion of key means 31. Thus, key means 31 may have its stem portion 32 which passes through opening 34 in wall portion 14, rotated to a position to allow the cross member 35 to pass through the upper slot 36 in yoke portion 26 of the latch means 25. The stem portion 32 is then rotated through an angle of 90° to locate the cross member 35 in lower slot 37. While in this position, key means 31 is pulled upwardly by its handle 33 to raise latch means 25 against the bias of springs 28, to disengage the arms 27 from the slots 24 in nut 11.

The member 12 may be now hand turned to unscrew the same from the outer end portion 22 of stud 10, thereby exposing nut 11 for permissible removal from stud 10 by the usual tools provided for the purpose. Means is provided for holding key means 31 in its raised position and to this end, a flat metal spring member 38 is formed with an opening 39 on a central portion thereof to slidably pass stem portion 32 therethrough while non-rotatably related thereto. The spring member 38 includes curved portions 40 at the opposite ends thereof which generally conform to the outer surface 13 of member 12 and terminate at their ends in small hemispherical knobs 41 on the inner sides thereof.

The outer surface 13 of member 12 is formed with a pair of diametrically opposed, shallow recesses 42 which are so located, that with key means 31 in its raised position, knobs 41 will snap into said recesses 42 to retain said key means 31 in the raised position thereof. In addition, recesses 42 provide indexing means for locating key means 31 in its proper angular positions for insertion into slot 36 of latch means 25 and turning in slot 37 to engage yoke portion 26 thereof.

As various changes might be made in the embodiment of the invention herein disclosed without departing from the spirit thereof, it is understood that all matter herein shown or described shall be deemed illustrative and not by way of limitation except as set forth in the appended claims.

What is claimed is:

1. In combination with a stud and a nut threaded thereon, nut lock means comprising a recessed member for enclosing said nut to prevent access thereto, means on said recessed member for connecting said recessed member to the outer end of said stud, latch means movably mounted within a recess portion of said recessed member and in non-rotatable relation thereto, said latch means and said nut having coacting means for connecting latch means with said nut to prevent rotation and removal of said recessed member from said stud, means for biasing said latch means in a direction to keep said latch means in engaged relation to said nut, key means for disengaging said latch means from said nut, said recessed member being formed with an opening in a wall portion thereof and in communicating relation to the recess portion of said recessed member, said key means including a portion thereof insertable into said opening to locate the outer end thereof within the recessed portion of said recessed member, coacting means on the outer end of said key means and said latch means for detachably connecting said latch means to said key means whereby said latch means may be moved in another direction to disengage said latch means from said nut whereby said recessed member may be rotated and disengaged from said stud to expose said nut.

2. The combination as in claim 1, wherein said recessed member is formed with a circular recess opening on a bottom surface portion thereof and an elongated recess in communicating relation with said circular recess, said nut being receivable in said circular recess, said latch means being elongated and disposed within said elongated recess of said recessed member.

3. The combination as in claim 1 wherein said nut is formed with a pair of opposed slot portions on the top surface thereof, and said latch means comprises a pair of laterally displaced arm portions, the outer ends of said arm portions being respectively receivable in the slot portions of said nut.

4. The combination as in claim 3 wherein said latch means comprises a yoke portion connecting said arm portions, said yoke portion being formed with slot means therein, the outer end of said key means portion being freely passable through the slot means of said yoke portion of said latch means when said key means is in one position thereof, said slot means including a portion for receiving and engaging said outer end of said key means portion when said key means is in another position thereof whereby withdrawn movement of said key means is operative to withdraw said latch means from engaging relation with said nut.

5. The combination as in claim 1 wherein said key means has associated therewith a spring member having oppositely disposed arm portions extending in close proximity to the outer surface portions of said recessed member, detent means on the arm portions of said spring member, said recessed member being formed on outer surface portions thereof with means for receiving said detent means.

6. In combination with a stud and a nut threaded thereon, nut lock means comprising a recessed member for enclosing said nut to deny access to said nut and the removal thereof from said stud, means on said recessed member for removably connecting the recessed member to the outer end of said stud, latch means movably mounted within a recess portion of said recessed member, said latch means and said nut including cooperating means for detachably connecting said latch means with said nut, means for resiliently biasing said latch means in a direction to maintain said latch means in connected relation to said nut, whereby to prevent removal of said recessed member from said stud, means for moving said latch means in a direction to disconnect said latch means from said nut whereby said recessed member may be removed from said stud to expose said nut for removal from said stud.

7. The combination as in claim 6 wherein said recess portion of said recessed member is elongated and said latch means includes an elongated portion non-rotatably disposed in the elongated recessed portion of said recessed member.

8. The combination as in claim 7 wherein opposed wall portions of said elongated recessed portion of said recessed member are threaded to receive the outer end of said stud.

9. The combination as in claim 8 wherein said recessed member includes a second recess portion for receiving said nut therein, said nut being formed with opposed slot portions and said latch means including arm portions respectively receivable in the slot portions of said nut.

10. The combination as in claim 9 wherein said recessed member includes a wall portion formed with a passage extending from an exterior surface portion thereof to said first mentioned recess portion, said latch moving means comprising a key member having a stem portion passing through said passage, cooperating means on said latch means and said stem portion for detachably connecting said latch means to said key member for conjoint movement whereby said latch means is movable to disengage said nut upon movement of said key member outwardly through said passage.

11. The combination as in claim 10 wherein said recessed member and said key member include cooperating means for retaining said latch means in disengaged relation to said nut to thereby allow said recessed member to be rotated relative to said stud to remove said recessed member from said stud and to expose said nut.

12. The combination as in claim 11 wherein said recessed member is formed on its outer surface with a pair of diametrically opposed recesses and said key member includes an elongated spring member mounted on the stem portion thereof, said spring member generally conforming to the surface contour of the outer surface of said recessed member and detent means on the outer ends of said spring member receivable in said pair of recesses to maintain said key member in a position wherein said latch means is retained in disengaged relation to said nut.

References Cited
UNITED STATES PATENTS

| 1,530,521 | 3/1925 | Robinson | 70—232 |
| 1,604,690 | 10/1926 | Halaby | 70—232 |
| 1,705,590 | 3/1929 | Simpson | 70—232 |
| 1,760,977 | 6/1930 | Duffy | 70—232 |

MARVIN A. CHAMPION, *Primary Examiner.*

E. J. McCARTHY, *Assistant Examiner.*